United States Patent [19]

Mickelson

[11] Patent Number: 4,737,880

[45] **Date of Patent: * Apr. 12, 1988**

[54] STATION PROTECTOR FOR COMMUNICATIONS LINES

[75] Inventor: Nils P. Mickelson, Buxton, Me.

[73] Assignee: GTE Products Corporation, Stamford, Conn.

[ * ] Notice: The portion of the term of this patent subsequent to Dec. 30, 2003 has been disclaimed.

[21] Appl. No.: 917,448

[22] Filed: Oct. 9, 1986

Related U.S. Application Data

[63] Continuation-in-part of Ser. No. 664,111, May 17, 1984, Pat. No. 4,633,360, which is a continuation-in-part of Ser. No. 461,765, Jan. 28, 1983, abandoned.

[51] Int. Cl.⁴ .......... H02H 9/06

[52] U.S. Cl. .......... 361/119; 361/124; 337/32

[58] Field of Search .......... 361/124, 56, 117-120; 337/28, 29, 32-34

[56] References Cited

U.S. PATENT DOCUMENTS

| | | | |
|---|---|---|---|
| 4,132,915 | 1/1979 | Wilms | 361/124 X |
| 4,447,848 | 5/1984 | Smith | 361/120 X |
| 4,506,310 | 3/1985 | Schwartz | 361/124 X |
| 4,584,624 | 4/1986 | Hines | 361/124 X |
| 4,633,360 | 12/1986 | Mickelson | 361/119 |
| 4,641,218 | 2/1987 | Scalera | 361/119 |

*Primary Examiner*—A. D. Pellinen

*Assistant Examiner*—Todd E. DeBoer

*Attorney, Agent, or Firm*—James Theodosopoulos

[57] ABSTRACT

A station protector for communication lines includes a line terminal formed for electrical connection to the communication lines and affixed to a base member of electrical insulator material. The base member has a well into which an arrester cartridge can be threaded. There is a grounding element affixed to the base member, the grounding element including an extending grounding member located outside the area of the well. A spring electrically connects the line terminal to a surge voltage arrester if an arrester cartridge is properly positioned in the well, and grounds the line terminal in the absence of the arrester cartridge or any part thereof.

1 Claim, 5 Drawing Sheets

STATION PROTECTOR FOR COMMUNICATIONS LINES

This application is a continuation-in-part of Ser. No. 664,111 filed 5/17/84, now U.S. Pat. No. 4,633,360, which is a continuation-in-part of Ser. No. 461,765, filed Jan. 28, 1983 abandoned.

This application concerns station protectors for communication lines. Examples of such protectors are shown in U.S. Pat. Nos. 4,447,848, 4,405,967, 4,351,015, 4,340,923, 4,241,374, 4,208,694, 4,158,869, 4,142,220, 4,132,915, 4,104,693, 4,013,927, 4,002,952, 3,993,933, 3,989,973, 3,979,646, 3,755,715 and 3,310,712.

Such protectors comprise an insulating block having a substantially cylindrical well in which an arrester cartridge is inserted. The arrester cartridge comprises a cylindrical metal shell, threaded near the top, having a hexagonal nut at the top. An arrester, such as a gas tube or carbon air-gap, is disposed in the shell and there is a cage, encircling the arrester, disposed between the arrester and the shell.

It occasionally happens that a defective arrester will be removed from the protector and, because no immediate replacement is at hand, the shell will be threaded back into the block without an arrester and/or cage. In such a case, of course, the protector provides no protection. The problem is that the unprotected circuit remains functional and that external examination of the protector does not indicate absence of an arrester. It is a purpose of this invention to solve the problem by shorting out the circuit to be protected until the arrester is replaced.

This invention provides for shorting the circuit to ground unless three elements, namely, the shell, the cage and the surge voltage arrester, are properly in place. In other words, if one of the three elements is missing, the circuit will be grounded.

In one embodiment, the means for shorting the circuit to ground is a cantilever spring. In another embodiment, said shorting means is a coiled spring. In both cases the spring is electrically conductive and becomes part of the shorting circuit. Also, in both cases, the means for grounding the circuit includes an extending metal member outside the area of the well but which extends in about the same direction as the axis of the well.

In the drawing, FIG. 1 is a perspective view of a station protector without a cover.

Figure 1:
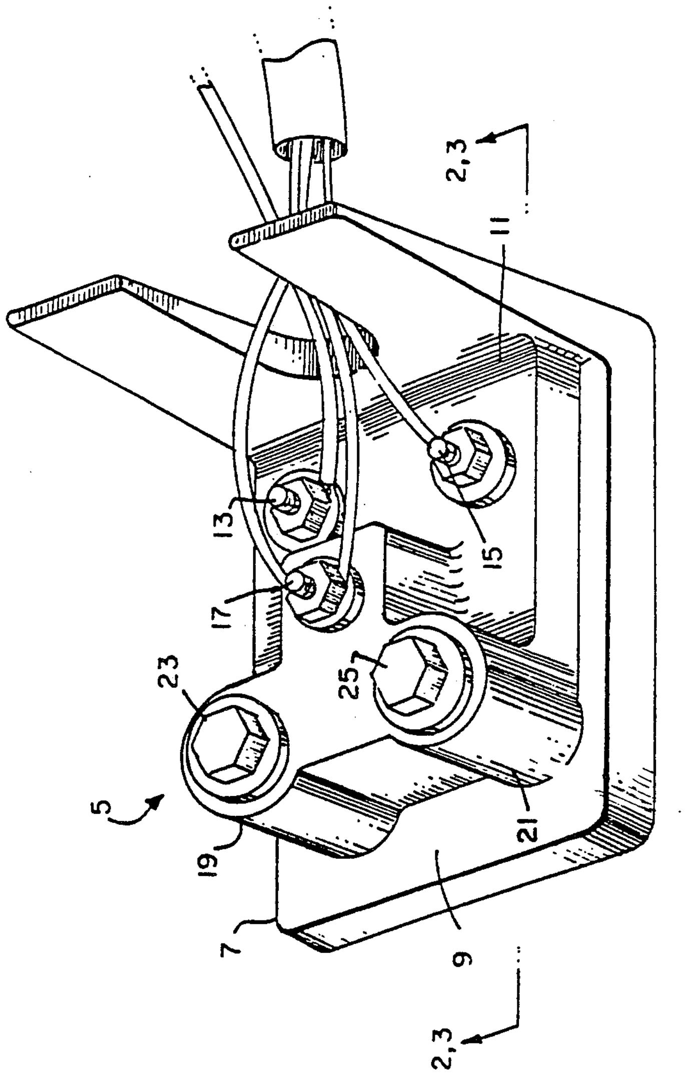

In this invention, as shown in FIG. 1, a station protector 5 has a block or base member 7 of an electrical insulator material such as phenolic plastic for example. Base member 7 includes a pair of elongated slots 9 and 11 which extend in a direction normal to one another and are formed for adjustable attachment of base member 7 to a support member (not shown), such as a building or pole.

A pair of line terminals or posts 13 and 15 are affixed to base member 7 either by a molding arrangement or preferably by attachment after base portion 7 has been fabricated. Each of posts 13 and 15 is connectable to one of a pair of communications lines which is in turn, connectable to an energy source and to a remotely located instrument such as a telephone or computer terminal.

A grounding means 17, which may be in the form of an electrically conducting post, is affixed to base member 7 in a manner similar to the above-described posts 13 and 15 and is, in turn, connectable to a circuit ground. Also, base member 7 includes a pair of wells or apertured members 19 and 21 each formed to receive an arrester cartridge, 23 and 25 respectively. Moreover, station protector 5 is formed for attachment of a cover member (not shown) to base member 7 to provide for enclosure of electrical conductors 13 and 15, grounding means 17 and arrester cartridges 23 and 25.

Figure 2:
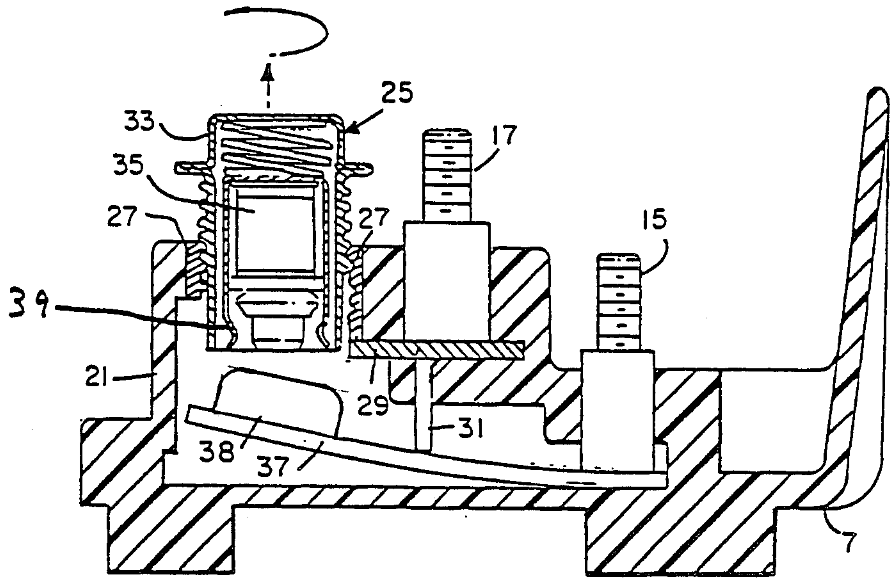
FIG. 2 is a cross-sectional view of one embodiment of this invention showing the protector configuration prior to insertion of an arrester cartridge.
Figure 3:
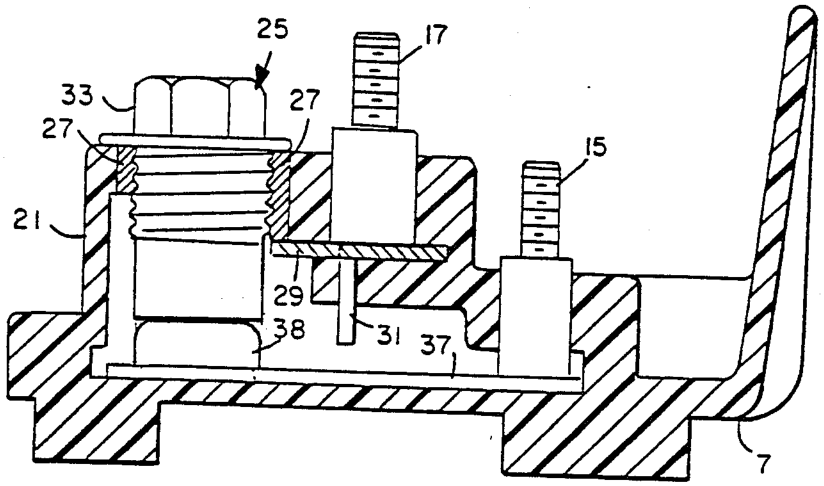
FIG. 3 shows the station protector with the arrester cartridge in operational position.

In one embodiment, as shown in FIGS. 2 and 3, apertured member 21 includes a threaded member 27 therein which is electrically and mechanically coupled to grounding means 17 by way of a structural metal member 29. Also, structural metal member 29 includes a downwardly extending portion or rod 31. A threaded tubular housing member or shell 33 of arrester cartridge 25 is screwed into threaded metal member 27. Arrester cartridge 25 includes an arrester 35, for example, a sealed cold cathode gas tube or a carbon air gap, and a cage 39 and can include a secondary arc gap and a fusible pellet all of which are, when in place, in electrical contact with shell 33.

Electrical conductor 15 has a resilient electrically conductive member or spring 37 connected thereto with a contact member 38 at the opposite end thereof extending into apertured member 21. Spring 37 is biased to contact downwardly extending portion 31 of structural metal member 29 whenever arrester cartridge 25 is absent or withdrawn from apertured member 21. Spring 37 is a substanitally flat, cantilever spring fixed at the end opposite arrester assembly 25 and is substantially orthogonal therewith, as well as with rod 31, in order to provide frictionless contact.

As shown in FIG. 3, a properly inserted arrester cartridge 25 exerts a frictionless force on spring 37 such that contact between spring 37 and rod 31 is interrupted or discontinued while electrical connection from electrical conductor 15 to arrester cartridge 25 is provided.

Thus, spring 37 provides capability for disconnecting line terminal 15 from ground 17 and connecting line terminal 15 to arrester cartridge 25 whenever arrester cartridge 25 is properly positioned within station protector 5. However, with arrester 35 and cage 39 absent, even if shell 33 is threaded into member 27, spring 37 is biased upwards and makes contact with rod 31, thereby grounding line terminal 15 and rendering its circuit inoperative. Rod 31 is substantially parallel to the axis of gas tube 35 so that the force of spring 37 on rod 31 will be substantially frictionless, for the reason previously mentioned.

Figure 4:
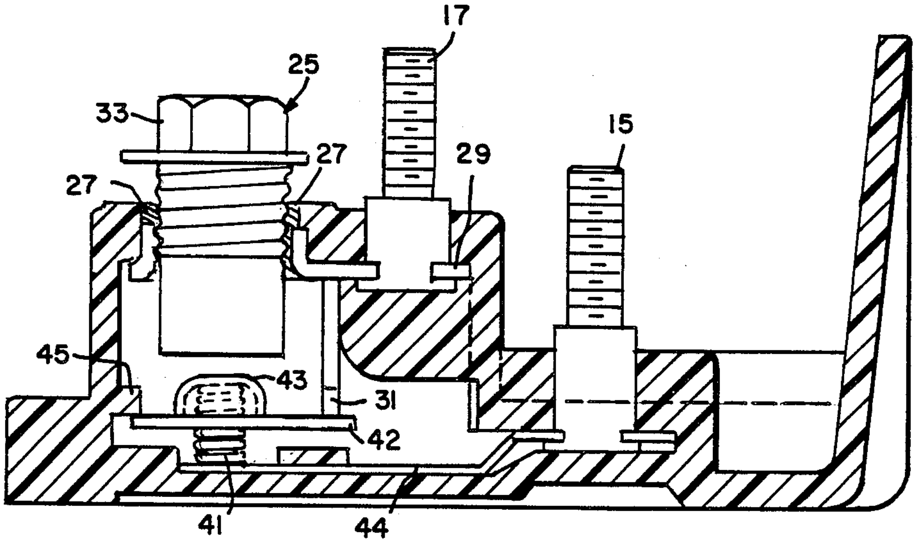
FIG. 4 is a cross-sectional view of another embodiment showing the protector configuration prior to insertion of an arrester cartridge.
Figure 5:
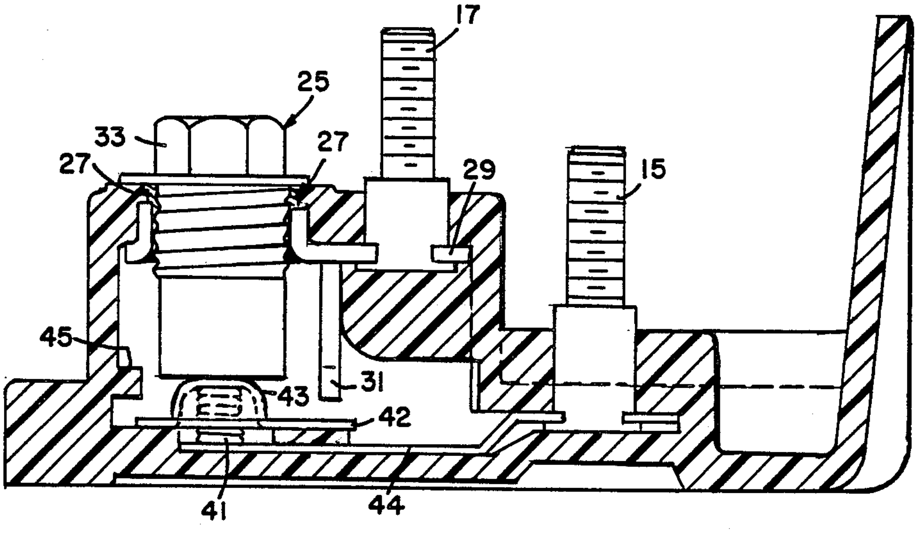
FIG. 5 shows the station protector with the arrester cartridge in operation position.

In another embodiment, shown in FIGS. 4 and 5, cantilever spring 37 is replaced by a coiled spring 41 and a horizontal contact member 42. There is an inverted recess 43 in contact member 42 into which coiled spring 41 loosely fits and which keeps coiled spring 41 in place in an upright position. There is a horizontal metal member 44 one end of which is in electrical contact with terminal 15. Coiled spring 41 rests on, and is in electrical contact with, the other end of metal member 44.

When arrester cartridge 25, comprising shell 33, arrester 35 and cage 39, is properly in place, as shown in FIG. 5, contact member 42 is pushd out of contact with downwardly extending grounding member 31, and the circuit is operative. If any of shell 33 or arrester 35 or cage 39 is missing, downwardly extending grounding member 31, thereby grounding terminal 15 and rendering the circuit inoperative. In order to maintain contact member 42 suitably horizontal in the up position, a stop 45 can be located opposite grounding member 31 at about the same elevation.

We claim:

1. A station protector comprising:

a base member of electrical insulator material;

mounting means formed in said member mounting an arrestercartridge comprising a threaded metal shell, an arrester and a cage, said mounting means including a substantially cylindrical well into which the arrester cartridge can be threaded;

grounding means affixed to said base member and formed to connect to a circuit ground and to said arrester cartridge, said grounding means including a vertically extending grounding member outside the area of the well but which extends in about the same direction as the axis of the well;

a line terminal affixed to said base member and formed to connect to a circuit; and an electrically conductive spring arranged to ground the line terminal to the grounding means by means of the extending grounding member in the absence of any of the arrester or cage or shell, and to connect the line terminal to the arrester cartridge when the complete arrester cartridge is properly mounted in the mounting means, the arrangement to ground the line terminal to the grounding means including a horizontal metal member which is pushed into contact with the vertically extending grounding member in the absence of any of the arrester or cage or shell, the point of contact therebetween being outside the area of the well, the vertically extending grounding member being substantially orthogonal to said horizontal metal member.

* * * * *